United States Patent
Baek et al.

(10) Patent No.: US 9,671,546 B2
(45) Date of Patent: Jun. 6, 2017

(54) BACKLIGHT ASSEMBLY AND DISPLAY DEVICE HAVING THE SAME

(71) Applicant: Samsung Display Co., Ltd., Yongin, Gyeonggi-Do (KR)

(72) Inventors: Seung Hwan Baek, Seoul (KR); Dong Hoon Kim, Suwon-si (KR); Seok Hyun Nam, Seoul (KR); Chan Jae Park, Osan-si (KR); Dong Hyeon Lee, Seoul (KR); Yeong Bae Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 416 days.

(21) Appl. No.: 14/297,283

(22) Filed: Jun. 5, 2014

(65) Prior Publication Data

US 2015/0219832 A1    Aug. 6, 2015

(30) Foreign Application Priority Data

Feb. 5, 2014 (KR) ........................ 10-2014-0013117

(51) Int. Cl.
*F21V 7/04* (2006.01)
*F21V 8/00* (2006.01)

(52) U.S. Cl.
CPC ........... *G02B 6/0053* (2013.01); *G02B 6/005* (2013.01); *G02B 6/0031* (2013.01); *G02B 6/0055* (2013.01); *G02B 6/0068* (2013.01)

(58) Field of Classification Search
CPC ........... G02F 1/133615; G02B 6/0001; G02B 6/0035; G02B 6/004; G02B 6/0043; G02B 6/0053; G02B 6/0031; G02B 6/005; G02B 6/0055; G02B 6/0068

USPC ........................................................ 362/606
See application file for complete search history.

(56) References Cited

U.S. PATENT DOCUMENTS

| 7,481,562 | B2* | 1/2009 | Chua | G02B 6/0023 |
|           |     |        |      | 362/339 |
| 8,439,547 | B2* | 5/2013 | Chiu | G02F 1/133609 |
|           |     |        |      | 349/62 |
| 8,727,597 | B2* | 5/2014 | Meir | G02B 6/0021 |
|           |     |        |      | 362/612 |

(Continued)

FOREIGN PATENT DOCUMENTS

| JP | 08-335048 | 12/1996 |
| JP | 2002-162912 | 6/2002 |

(Continued)

*Primary Examiner* — Bryon T Gyllstrom
(74) *Attorney, Agent, or Firm* — Innovation Counsel LLP

(57) ABSTRACT

Provided are a backlight assembly and a display device having the same. A backlight assembly includes a light source unit which emits light, a light guide plate (LGP) including an incident surface upon which light emitted from the light source unit is incident, an opposite surface which faces the incident surface, and an exit surface which connects the incident surface and the opposite surface and from which light incident upon the incident surface exits, a wavelength conversion member which is located on the exit surface and converts a wavelength of light output from the exit surface, and a first reflective member which is located on the opposite surface and reflects light incident upon the opposite surface, wherein the first reflective member includes a plurality of first color patterns which face the opposite surface.

20 Claims, 20 Drawing Sheets

(56) References Cited

U.S. PATENT DOCUMENTS

| | | | |
|---|---|---|---|
| 2003/0137821 A1* | 7/2003 | Gotoh | G02B 6/0016 362/612 |
| 2003/0210222 A1* | 11/2003 | Ogiwara | G02B 6/0036 345/103 |
| 2006/0119915 A1* | 6/2006 | Sugiura | G02B 26/026 359/15 |
| 2009/0141476 A1* | 6/2009 | Meir | G02B 6/005 362/84 |
| 2011/0194306 A1* | 8/2011 | Krijn | G02B 6/004 362/607 |
| 2012/0127752 A1* | 5/2012 | Jung | G09F 13/18 362/602 |
| 2014/0029298 A1* | 1/2014 | Hyun | G02B 6/0003 362/608 |

FOREIGN PATENT DOCUMENTS

| | | |
|---|---|---|
| JP | 2003-279985 | 10/2003 |
| JP | 2006-066338 | 3/2006 |
| JP | 2011-040313 | 2/2011 |
| JP | 2011-159515 | 8/2011 |
| JP | 2013-064926 | 4/2013 |
| KR | 10-2005-0015669 A | 2/2005 |
| KR | 10-2006-0046929 A | 5/2006 |
| KR | 10-2011-0135097 A | 12/2011 |
| KR | 10-2012-0018490 A | 3/2012 |
| KR | 10-2012-0067550 A | 6/2012 |
| KR | 10-2012-0139593 A | 12/2012 |
| KR | 10-2013-0023978 A | 3/2013 |
| KR | 10-2013-0026070 A | 3/2013 |

* cited by examiner

410

412

BACKLIGHT ASSEMBLY AND DISPLAY DEVICE HAVING THE SAME

This application claims priority from Korean Patent Application No. 10-2014-0013117 filed on Feb. 5, 2014 in the Korean Intellectual Property Office, the disclosure of which is incorporated herein by reference in its entirety.

BACKGROUND OF THE INVENTION

1. Field of the Invention

The present invention relates to a backlight assembly and a display device having the same.

2. Description of the Related Art

Display devices are devices that visually display data. Examples of display devices include liquid crystal displays (LCDs), electrophoretic displays, organic light-emitting displays, inorganic electroluminescent (EL) displays, field emission displays, surface-conduction electron-emitter displays, plasma displays, and cathode ray displays.

Of the above display devices, an LCD includes a liquid crystal layer between two transparent substrates and displays a desired image by controlling the light transmittance of each pixel according to the driving of the liquid crystal layer.

Because liquid crystals of such an LCD cannot emit light by themselves, the LCD includes a backlight assembly that provides light to the liquid crystal layer. The backlight assembly typically includes a light source unit, a reflective plate, a diffusion plate, a light guide plate (LGP), and various optical sheets.

Backlight assemblies are classified into direct-type backlight assemblies and edge-type backlight assemblies according to the position of the light source unit. In a direct-type backlight assembly, the light source unit is placed to face a lower surface of the diffusion plate. In an edge-type backlight assembly, the light source unit is placed to face a side surface of the LGP.

Generally, a light source unit used in an edge-type backlight assembly includes a light source which emits blue light and a wavelength conversion material which is located on the light source and converts blue light into white light. Accordingly, the light source unit provides white light to the LGP.

However, if the wavelength conversion material is located adjacent to the light source, its properties can be degraded by, e.g., the degradation of the light source. Therefore, the wavelength conversion material may be separated from the light source by more than a certain distance. To this end, a wavelength conversion member including the wavelength conversion material may be placed on an upper surface of the LGP.

In this case, the light source unit may provide the LGP with blue light, not white light. Most of the blue light provided to the LGP may be converted into white light by the wavelength conversion material disposed on the upper surface of the LGP. However, the blue light may also leak through side surfaces of the LGP, excluding a side surface facing the light source unit.

To prevent this leakage of blue light, the area of the wavelength conversion member may be increased to be greater than that of the upper surface of the LGP. However, there still exists a possibility of leakage of blue light due to the horizontal movement of the wavelength conversion member. In addition, if the area of the wavelength conversion member is increased to be greater than that of the upper surface of the LGP, it is difficult to realize a display device having a narrow bezel.

SUMMARY OF THE INVENTION

A backlight assembly capable of preventing the leakage of blue light through side surfaces of a light guide plate (LGP) in a structure in which a wavelength conversion member is disposed on an upper surface of the LGP is provided.

A display device capable of preventing the leakage of blue light through side surfaces of an LGP in a structure in which a wavelength conversion member is disposed on an upper surface of the LGP is also provided.

However, aspects are not restricted to the ones provided herein. The above and other aspects will become more apparent to one of ordinary skill in the relevant art by referencing the detailed description of the embodiments given below.

According to an aspect, there is provided a backlight assembly including a light source unit which emits light, a light guide plate (LGP) including an incident surface upon which light emitted from the light source unit is incident, an opposite surface which faces the incident surface, and an exit surface which connects the incident surface and the opposite surface and from which light incident upon the incident surface exits, a wavelength conversion member which is located on the exit surface and converts a wavelength of light output from the exit surface, and a first reflective member which is located on the opposite surface and reflects light incident upon the opposite surface, wherein the first reflective member includes a plurality of first color patterns which face the opposite surface.

The wavelength conversion member may include quantum dots.

The wavelength conversion member may convert a color of light output from the exit surface into a white color.

The first color patterns may be located only in a region adjacent to a side of the opposite surface which contacts the exit surface and a region adjacent to the other side of the opposite surface.

The first color patterns may be reduced in area or thickness toward a virtual line that is parallel to the side of the opposite surface which contacts the exit surface and that halves the opposite surface.

The first reflective member may further include a first reflective layer and a first adhesive layer located on the first reflective layer, wherein the first color patterns may be interposed between the first reflective layer and the first adhesive layer.

The first color patterns may include a yellow phosphor.

The light source unit may emit blue light.

The LGP further may include a first side surface and a second side surface which face each other and connect lateral sides of the incident surface and lateral sides of the opposite surface and further including a second reflective member which is located on the first side surface and reflects light incident upon the first side surface and a third reflective member which is located on the second side surface and reflects light incident upon the second side surface, wherein the second reflective member includes a plurality of second color patterns which face the first side surface, and the third reflective member includes a plurality of third color patterns which face the second side surface.

The second reflective member may further include a second reflective layer and a second adhesive layer located on the second reflective layer, and the third reflective member further includes a third reflective layer and a third adhesive layer located on the third reflective layer, wherein the second color patterns are interposed between the second reflective layer and the second adhesive layer, and the third color patterns are interposed between the third reflective layer and the third adhesive layer.

The second and third color patterns may be made of substantially the same material as the first color patterns.

The second and third color patterns may be reduced in area or thickness as a distance from the light source increases.

According to another aspect, there is provided a backlight assembly including an LGP including an upper surface, a lower surface which faces the upper surface, and a plurality of side surfaces which connect the upper surface and the lower surface, a light source unit which is located on any one of the side surfaces of the LGP and provides light to the LGP, and one or more reflective members which are located on the other side surfaces of the LGP and reflect light provided to the LGP, wherein each of the reflective members comprises a plurality of color patterns which face the LGP.

The backlight assembly may further include a wavelength conversion member which is located on the upper surface of the LGP and converts a wavelength of light output from the LGP.

The wavelength conversion member may include quantum dots.

The color patterns may be located only in a region adjacent to the upper surface of the LGP and a region adjacent to the lower surface of the LGP.

Each of the reflective members may further include a reflective layer and an adhesive layer located on the reflective layer, wherein the color patterns are interposed between the reflective layer and the adhesive layer.

According to still another aspect, there is provided a display device including a display panel which displays an image, and a backlight assembly which provides light to the display panel, wherein the backlight assembly includes a light source unit which emits light, an LGP including an incident surface upon which light emitted from the light source unit is incident, an opposite surface which faces the incident surface, and an exit surface which connects the incident surface and the opposite surface and from which light incident upon the incident surface exits, a wavelength conversion member which is located on the exit surface and converts a wavelength of light output from the exit surface, and a first reflective member which is located on the opposite surface and reflects light incident upon the opposite surface, wherein the first reflective member includes a plurality of first color patterns which face the opposite surface.

The wavelength conversion member may include quantum dots.

The LGP may further include a first side surface and a second side surface which face each other and connect lateral sides of the incident surface and lateral sides of the opposite surface and further including a second reflective member which is located on the first side surface and reflects light incident upon the first side surface and a third reflective member which is located on the second side surface and reflects light incident upon the second side surface, wherein the second reflective member includes a plurality of second color patterns which face the first side surface, and the third reflective member includes a plurality of third color patterns which face the second side surface.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE INVENTION

Figure 1:
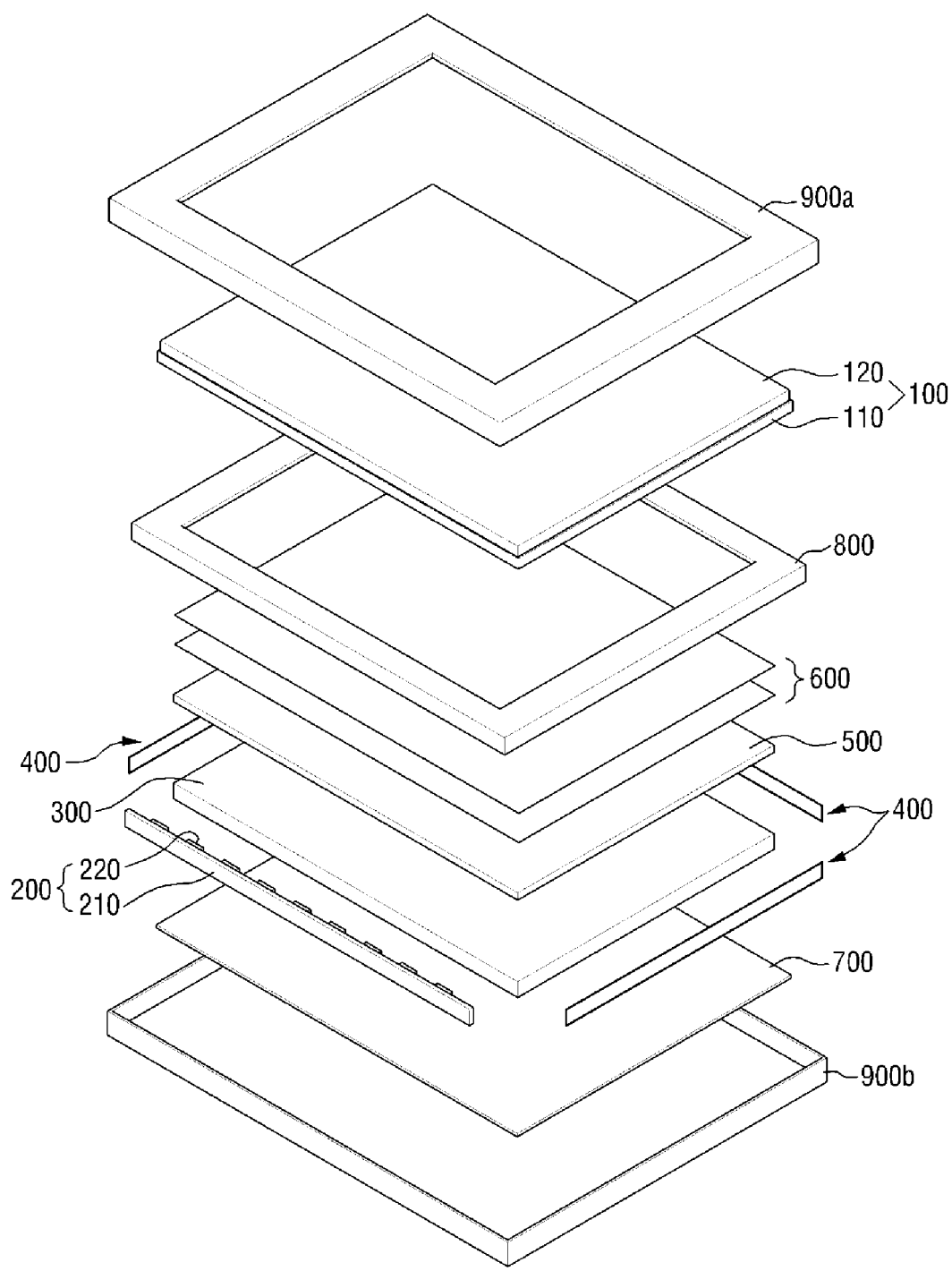
FIG. 1 is an exploded perspective view of a display device according to an embodiment.

The aspects and features of the present disclosure and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are provided to assist those of ordinary skill in the art in understanding of the embodiments.

The term "on" that is used to designate that an element is on another element or located on a different layer or a layer includes both a case where an element is located directly on another element or a layer and a case where an element is located on another element via another layer or still another element. In the entire description, the same drawing reference numerals are used for the same elements across various figures.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

Hereinafter, embodiments will be described with reference to the attached drawings.

FIG. 1 is an exploded perspective view of a display device according to an embodiment. Referring to FIG. 1, the display device according to the current embodiment includes a display panel 100 and a backlight assembly. The display device according to the current embodiment may further include a top chassis 900a and a bottom chassis 900b.

The display panel 100 is a panel that displays an image. The display panel 100 may be a liquid crystal display (LCD) panel, an electrophoretic display panel, an organic light-emitting diode (OLED) panel, a light-emitting diode (LED) panel, an inorganic electroluminescent (EL) display panel, a field emission display (FED) panel, a surface-conduction electron-emitter (SED) display panel, a plasma display panel (PDP), or a cathode ray tube (CRT) display panel. Hereinafter, an LCD will be described as an example of the display device according to the current embodiment, and an LCD panel will be described as an example of the display panel 100 according to the current embodiment. However, the display device and the display panel 100 are not limited thereto, and various display devices and display panels can be used.

The display panel 100 may include a display area where an image is displayed and a non-display area where no image is displayed. In addition, the display panel 100 may include a first substrate 110, a second substrate 120 which faces the first substrate 110, and a liquid crystal layer (not shown) which is interposed between the first substrate 110 and the second substrate 120.

The first substrate 110 and the second substrate 120 may be shaped like rectangular parallelepipeds. In FIG. 1, the first and second substrates 110 and 120 shaped like rectangular parallelepipeds are illustrated for ease of description, but the shapes of the first and second substrates 110 and 120 are not limited to the rectangular parallelepipeds and can vary according to the shape of the display panel 100.

The liquid crystal layer may be interposed between the first substrate 110 and the second substrate 120. In addition, a sealing member such as a sealant may be placed along the periphery of the first substrate 110 and the second substrate 120 to bond the first substrate 110 and the second substrate 120 together.

Although not illustrated in FIG. 1, the display panel 100 may include a driver and a flexible circuit board which are attached to the first substrate 110 or the second substrate 120. The driver may transmit various signals (such as a driving signal) needed to display an image in the display area. The flexible circuit board may transmit various signals to the driver.

The backlight assembly may be disposed under the display panel 100. The backlight assembly may provide light to the display panel 100. The backlight assembly includes a light source unit 200, a light guide plate (LGP) 300, one or more reflective members 400, and a wavelength conversion member 500. The backlight assembly may further include an optical sheet 600, a reflective plate 700, and a mold frame 800.

The light source unit 200 may generate light and irradiate the generated light toward the LGP 300. The light source unit 200 may be disposed on a side surface (i.e., an incident surface 310) of the LGP 300. In an example embodiment, the light source unit 200 may be placed in a position facing one long side of the LGP 300. However, the present invention is not limited thereto, and the light source unit 200 may also be placed in a position facing one short side of the LGP 300.

The light source unit 200 may include a circuit board 210 and a plurality of light sources 220 disposed on the circuit board 210.

The circuit board 210 may be disposed on the incident surface 310 of the LGP 300. The circuit board 210 may be connected to a power source (not shown) and deliver electrical energy to the light sources 220. A surface of the circuit board 210 which faces the incident surface 310 of the LGP 300 may have a shape corresponding to the shape of the incident surface 310 of the LGP 300. In an example embodiment, the surface of the circuit board 210 may be parallel to the incident surface 310 of the LGP 300. In addition, the area of the surface of the circuit board 210 may be substantially equal to the area of the incident surface 310 of the LGP 300.

The light sources 220 may be disposed on the surface of the circuit board 210. The light sources 220 may convert electrical energy received through the circuit board 210 into light energy. The light sources 220 may be arranged at regular intervals. In addition, the light sources 220 may be arranged in a row. The light sources 220 may be arranged to correspond to the shape of the incident surface 310 of the LGP 300 which faces the light sources 220. The light sources 220 may be light-emitting diodes (LEDs). In addition, the light sources 220 may emit blue light. In an example embodiment, the light sources 220 may be, but are not limited to, blue LEDs that emit blue light. In the example embodiment of FIG. 1, the surface of the circuit board 210 which contacts the light sources 220 is parallel to the incident surface 310. However, the present disclosure is not limited thereto, and the surface of the circuit board 210 which contacts the light sources 220 may also be perpendicular to the incident surface 310. That is, the light source unit 200 may have a side-emitting structure. Here, a reflective layer may be formed on the light sources 220 to guide light emitted from the light sources 220 toward the incident surface 310.

The LGP 300 may be located on a side of the light source unit 200. That is, the LGP 300 may lie in substantially the same plane with the light source unit 200. The LGP 300 may guide light emitted from the light source unit 200 to the display panel 100.

The LGP 300 may be made of a transparent material. In an example embodiment, the LGP 300 may be made of polymethyl methacrylate (PMMA). However, the material of the LGP 300 is not limited to PMMA, and the LGP 300 may also be made of various transparent materials that can guide light. In addition, the LGP 300 may be made of a rigid material. However, the material of the LGP 300 is not limited to the rigid material, and the LGP 300 may also be made of a flexible material.

The LGP 300 may be shaped like a rectangular parallelepiped plate. In the present disclosure, the LGP 300 shaped like a rectangular parallelepiped plate will be described. However, the shape of the LGP 300 is not limited to the rectangular parallelepiped plate, and the LGP 300 can have various shapes.

Figure 3:
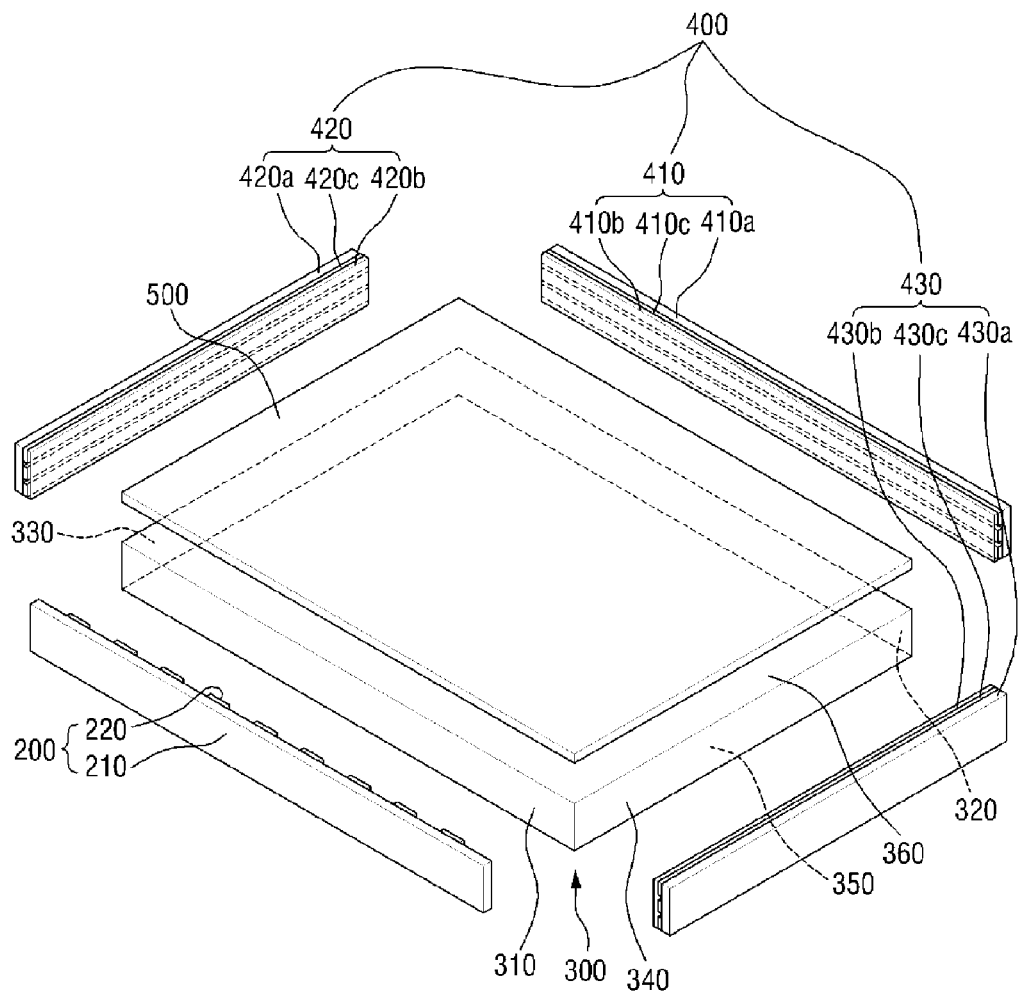
FIG. 3 is an exploded perspective view of a backlight assembly of the display device of FIG. 1.

The LGP 300 will now be described in greater detail with reference to FIG. 3. FIG. 3 is an exploded perspective view of the backlight assembly of the display device of FIG. 1. Referring to FIG. 3, the LGP 300 may include the incident surface 310, an opposite surface 320, a first side surface 330, a second side surface 340, a support surface 350, and an exit surface 360.

The incident surface 310 may be a portion of the LGP 300 upon which light emitted from the light source unit 200 is incident. The incident surface 310 may be one of the side surfaces of the LGP 300. The incident surface 310 may be a side surface corresponding to a long side of the LGP 300. However, the present disclosure is not limited thereto, and the incident surface 310 may also be a side surface corresponding to a short side of the LGP 300.

The opposite surface 320 may be a portion of the LGP 300 which faces the incident surface 310. The opposite surface 320 may be one of the side surfaces of the LGP 300. The opposite surface 320 may be the surface of the LGP 300 toward which light emitted from the light source unit 200 travels upon entering the LGP 300. That is, the opposite surface 320 may be a portion of the LGP 300 which is farthest from the light source unit 200.

The first side surface 330 and the second side surface 340 may connect lateral sides of the incident surface 310 and lateral sides of the opposite surface 320. Each of the first side surface 330 and the second side surface 340 may be one of the side surfaces of the LGP 300. The first side surface 330 and the second side surface 340 may face each other. The first side surface 330 and the second side surface 340 which face each other may be parallel to each other. In addition, the first side surface 330 and the second side surface 340 may be symmetrical with respect to a center of the LGP 300.

The support surface 350 may connect a lower side of the incident surface 310 and a lower side of the opposite surface 320. The support surface 350 may connect a lower side of the first side surface 330 and a lower side of the second side surface 340 in addition to the lower side of the incident surface 310 and the lower side of the opposite surface 320. The support surface 350 may be a lower surface of the LGP 300. The support surface 350 may support the LGP 300 and other elements disposed on the LGP 300.

The exit surface 360 may connect an upper side of the incident surface 310 and an upper side of the opposite surface 320. The exit surface 360 may connect an upper side of the first side surface 330 and an upper side of the second side surface 340 in addition to the upper side of the incident surface 310 and the upper side of the opposite surface 320. The exit surface 360 may be an upper surface of the LGP 300. Light emitted from the light source unit 200 to the LGP 300 may pass through the exit surface 360 of the LGP 300 and then enter the display panel 100.

Referring back to FIG. 1, the reflective members 400 may be disposed on side surfaces of the LGP 300 where the light source unit 200 is not located. That is, the reflective members 400 may be disposed on the opposite surface 320, the first side surface 330 and the second side surface 340 of the LGP 300, excluding the incident surface 310 of the LGP 300. The reflective members 400 can prevent light, which is input into the LGP 300 from the light source unit 200, from leaking to the outside of the LGP 300 through the side surfaces of the LGP 300. That is, light travelling from the inside of the LGP 300 toward the outside may be sent back toward the inside of the LGP 300 by the reflective members 400. The reflective members 400 will be described in greater detail below.

The wavelength conversion member 500 may be located on the exit surface 360 of the LGP 300. Specifically, the wavelength conversion member 500 may be interposed between the LGP 300 and the optical sheet 600. The wavelength conversion member 500 may convert a wavelength of light output from the exit surface 360. In an example embodiment, the wavelength conversion member 500 may convert blue light output from the exit surface 360 into white light, but the present disclosure is not limited thereto.

The wavelength conversion member 500 may be in the form of a sheet. In an example embodiment, the area of the wavelength conversion member 500 may be substantially equal to the area of the exit surface 360 of the LGP 300. In another example embodiment, the area of the wavelength conversion member 500 may be substantially equal to the area of the optical sheet 600.

Figure 2:
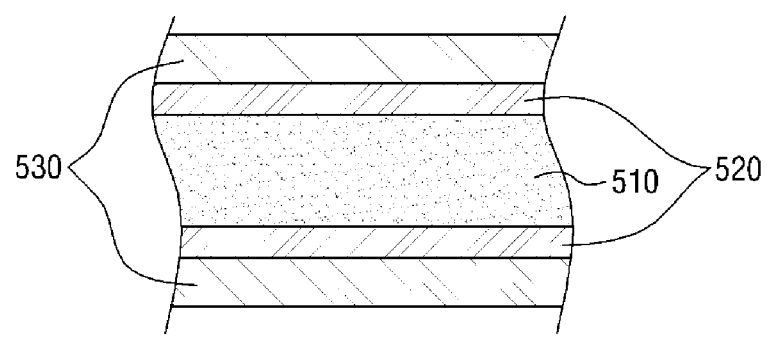
FIG. 2 is a cross-sectional view of a wavelength conversion member of the display device of FIG. 1.

The wavelength conversion member 500 will now be described in greater detail with reference to FIG. 2. FIG. 2 is a cross-sectional view of the wavelength conversion member 500 of the display device of FIG. 1. Referring to FIG. 2, the wavelength conversion member 500 may include a wavelength conversion layer 510, a first barrier layer 520, and a second barrier layer 530.

The wavelength conversion layer 510 may include a phosphor, quantum dots, or a combination of the same.

The phosphor may be a typical organic or inorganic phosphor. In an example embodiment, the phosphor may be a yellow phosphor. The yellow phosphor may be, but is not limited to, a YAG-based fluorescent material, a silicate-based fluorescent material, an oxynitride fluorescent material, or a combination of the same.

The quantum dots are semiconductor nanoparticles having a core-shell structure and are several to tens of nm in size. The quantum dots emit different light according to their particle size due to the quantum confinement effect. More specifically, the quantum dots generate strong light in a narrow wavelength band, and the light emission of the quantum dots occurs when unstable (excited) electrons fall from a conduction band to a valence band. The quantum dots tend to generate light having a short wavelength when their particle size is small and generate light having a long wavelength when their particle size is large. Therefore, light of all desired visible wavelengths can be generated by controlling the size of the quantum dots.

Each of the quantum dots may include, for example, any one nanocrystal selected from a group including a Si nanocrystal, a group II-VI compound semiconductor nanocrystal, a group III-V compound semiconductor nanocrystal, a group IV-VI compound semiconductor nanocrystal, and a mixture of the same.

The group II-VI compound semiconductor nanocrystal may be, for example, any one selected from the group including CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HggZnTe, CdZnSeS, CdZnSeTe, CdZnSTe, CdHgSeS, CdHgSeTe, CdHgSTe, HgZnSeS, HgZnSeTe, and HgZnSTe.

The group III-V compound semiconductor nanocrystal may be, for example, any one selected from the group including GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs. The group IV-VI compound semiconductor nanocrystal may be SbTe.

The wavelength conversion layer 510 may include not only a wavelength conversion material such as a phosphor and quantum dots but also a dispersive medium which disperses the wavelength conversion material. That is, the phosphor or the quantum dots may be dispersed in a dispersive medium, such as an organic solvent or a polymer resin, in such a manner as to be naturally dispersed therein. The dispersive medium may be any transparent medium that does not affect the wavelength conversion performance of the phosphor and the quantum dots, does not reflect light, and does not cause optical absorption.

The organic solvent may include, for example, at least one of toluene, chloroform, and ethanol. The polymer resin may include, for example, at least one of epoxy, polystyrene, and acrylate.

The wavelength conversion layer 510 may include an ultraviolet (UV) initiator, a thermosetting additive, a cross-linker, a dispersing agent and a combination of the same, in addition to the dispersive medium. The wavelength conversion layer 510 including a mixture of the wavelength conversion material and the above additives may be located on the first substrate 110.

The first barrier layer 520 may be located on upper and lower surfaces of the wavelength conversion layer 510. In an example embodiment, the first barrier layer 520 may surround the wavelength conversion layer 510. That is, the first barrier layer 520 may protect the wavelength conversion layer 510 from outside moisture and oxygen.

The first barrier layer 520 may be made of a material that can block moisture and oxygen. In an example embodiment, the first barrier layer 520 may include an insulating material such as silicon oxide (SiOx), silicon nitride (SiNx), or a combination of the same. In another example embodiment, the first barrier layer 520 may be a plastic film such as polyethylene phthalate (PET) or polycarbonate (PC). In another example embodiment, the first barrier layer 520 may be made of a glass material.

The second barrier layer 530 may be disposed on an upper surface of the first barrier layer 520 located on the upper surface of the wavelength conversion layer 510 and may also be disposed on a lower surface of the first barrier layer 520 located on the lower surface of the wavelength conversion layer 510. In an example embodiment, the second barrier layer 530 may surround the wavelength conversion layer 510 and the first barrier layer 520. That is, the second barrier layer 530 may protect the wavelength conversion layer 510 and the first barrier layer 520 from external moisture and oxygen.

The second barrier layer 530 may be made of a material that can block moisture and oxygen. In an example embodiment, the second barrier layer 530 may include an insulating material such as silicon oxide (SiOx), silicon nitride (SiNx), or a combination of the same. In another example embodiment, the second barrier layer 530 may be a plastic film such as polyethylene phthalate (PET) or polycarbonate (PC). In another example embodiment, the second barrier layer 530 may be made of a glass material. In another example embodiment, the second barrier layer 530 may be made of substantially the same material as the first barrier layer 520.

Referring back to FIG. 1, the optical sheet 600 may be disposed on the wavelength conversion member 500. The optical sheet 600 may modulate optical characteristics of light output from the exit surface 360 of the LGP 300 and then wavelength-converted by the wavelength conversion member 500. The optical sheet 600 may be provided in a plurality, and the optical sheets 600 may be stacked on each other to overlap and complement each other. In an example embodiment, the optical sheets 600 may include at least one prism sheet or diffusion sheet.

The reflective plate 700 may be disposed under the LGP 300. The reflective plate 700 may change the path of light emitted from the light source unit 200 that travels downward from the LGP 300. The reflective plate 700 may be made of a reflective material such as metal.

The mold frame 800 may be disposed between the display panel 100 and the optical sheets 600. The mold frame 800 may engage with the bottom chassis 900b, thereby fixing the light source unit 200, the LGP 300, the reflective members 400, the wavelength conversion member 500, the optical sheets 600, and the reflective plate 700. In addition, the mold frame 800 may contact the periphery of the display panel 100, thereby supporting and fixing the display panel 100.

The top chassis 900a may cover the periphery of the display panel 100 and cover side surfaces of the display panel 100 and the backlight assembly. The bottom chassis 900b may house the backlight assembly. The top chassis 900a and the bottom chassis 900b may engage with each other to surround the display panel 100 and the backlight assembly. The top chassis 900a and the bottom chassis 900b may be made of a conductive material such as metal.

Figure 4:
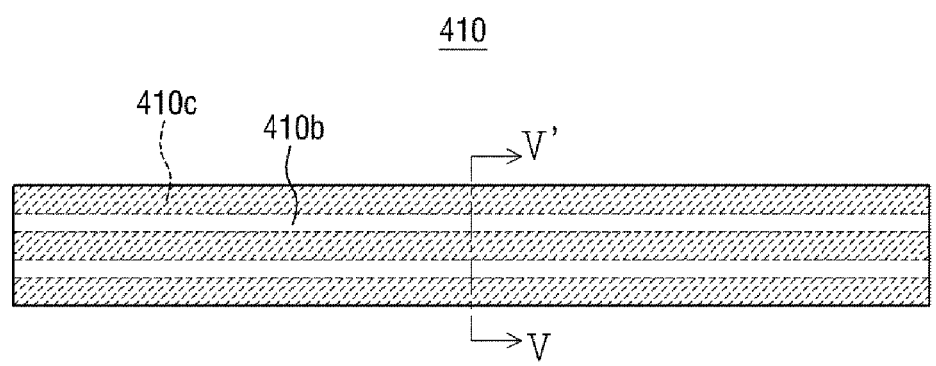
FIG. 4 is a front view of a first reflective member of the backlight assembly of FIG. 3.
Figure 5:
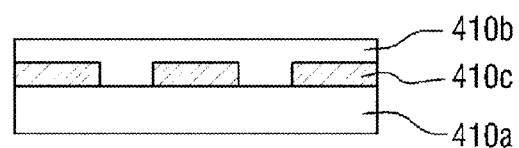
FIG. 5 is a cross-sectional view taken along the line V-V' of FIG. 4.

The reflective members 400 will now be described in greater detail with reference to FIGS. 3 through 5. FIG. 3 is an exploded perspective view of the backlight assembly of the display device of FIG. 1. FIG. 4 is a front view of a first reflective member 410 of the backlight assembly of FIG. 3. FIG. 5 is a cross-sectional view taken along the line V-V' of FIG. 4. In FIGS. 4 and 5, only the first reflective member 410 is illustrated in detail. Because a second reflective member 420 and a third reflective member 430 have substantially the same shape as the first reflective member 410 as will be described below, drawings thereof are omitted.

Referring to FIGS. 3 through 5, the reflective members 400 may include the first reflective member 410, the second reflective member 420, and the third reflective member 430.

The first reflective member 410 may be located on the opposite surface 320 of the LGP 300. The first reflective member 410 may be placed so as to face the opposite surface 320 of the LGP 300. In addition, the first reflective member 410 may be placed parallel to the opposite surface 320 of the LGP 300. The shape of the first reflective member 410 may correspond to the shape of the opposite surface 320 of the LGP 300. For example, the area of the first reflective member 410 which faces the opposite surface 320 may be substantially equal to the area of the opposite surface 320. In addition, a length of the first reflective member 410 may be substantially equal to a length of the opposite surface 320. In an example embodiment, the first reflective member 410 and the opposite surface 320 may completely overlap each other.

The first reflective member 410 may include a first reflective layer 410a, a first adhesive layer 410b, and a first color pattern 410c.

The first reflective layer 410a may include a reflective material. In an example embodiment, the first reflective layer 410a may include a metal material. In another example embodiment, the first reflective layer 410a may be a polymer layer coated with a reflective material. The first reflective layer 410a may have diffuse reflection or specular reflection characteristics. In addition, a surface of the first reflective layer 410a which faces the opposite surface 320 of the LGP 300 may be white.

The first reflective layer 410a may be made of a rigid material. However, the material of the first reflective layer 410a is not limited to the rigid material, and the first reflective layer 410a may also be made of a flexible material. In an example embodiment, if the LGP 300 is made of a rigid material, the first reflective layer 410a may also be made of a rigid material. If the LGP 300 is made of a flexible material, the first reflective layer 410a may also be made of a flexible material.

The first adhesive layer 410b may be located on the first reflective layer 410a. Specifically, the first adhesive layer 410b may be located on the surface of the first reflective layer 410a which faces the opposite surface 320 of the LGP

300. The first adhesive layer 410*b* may completely overlap the first reflective layer 410*a*.

The first adhesive layer 410*b* may be made of, for example, at least one of a thermosetting adhesive, a catalyst containing adhesive, a moisture cure adhesive, an anaerobic adhesive, a hot melt adhesive, an optically clear adhesive (OCA), and a pressure-sensitive adhesive. In an example embodiment, the first adhesive layer 410*b* may be made of an OCA. Here, the OCA may be transparent and semi-solid. Generally, a semi-solid material can be easily fixed in shape. Therefore, it is easier to deal with the semi-solid material than liquid resin. In another example embodiment, the adhesive strength of the first adhesive layer 410*b* may be adjusted to enable the first adhesive layer 410*b* to be easily attached to or detached from a target object.

The first adhesive layer 410*b* may directly contact the opposite surface 320 of the LGP 300. That is, the first adhesive layer 410*b* may be attached to the opposite surface 320 of the LGP 300, thereby fixing the LGP 300 and the first reflective member 410 to each other. In addition, a refractive index of the first adhesive layer 410*b* may be substantially equal to a refractive index of the LGP 300. Therefore, light input into the LGP 300 from the light source unit 200 may only be refracted to a very small extent at an interface between the first adhesive layer 410*b* and the LGP 300.

The first color pattern 410*c* may be interposed between the first reflective layer 410*a* and the first adhesive layer 410*b*. Specifically, the first color pattern 410*c* may be completely surrounded by the first reflective layer 410*a* and the first adhesive layer 410*b*. In an example embodiment, after the first color pattern 410*c* is formed on the first reflective layer 410*a*, it may be completely covered with the first adhesive layer 410*b*, thereby forming the first reflective member 410. Here, because the first adhesive layer 410*b* is thicker than the first color pattern 410*c*, the first color pattern 410*c* may be completely covered by the first adhesive layer 410*b*. In other words, the first color pattern 410*c* may be securely fixed in position by the first reflective layer 410*a* and the first adhesive layer 410*b*.

The first color pattern 410*c* may be formed on the surface of the first reflective layer 410*a* which faces the opposite surface 320 of the LGP 300. That is, light emitted from the light source unit 200 may pass through the LGP 300 and the first adhesive layer 410*b* to enter the first color pattern 410*c*.

The first color pattern 410*c* may be shaped like a stripe. In an example embodiment, a direction in which the first color pattern 410*c* extends may be the same as a direction in which the opposite surface 320 of the LGP 300 extends. In other words, long sides of the first color pattern 410*c* may be parallel to the upper and lower sides of the opposite surface 320 of the LGP 300. In addition, a length of each of the long sides of the first color pattern 410*c* may be equal to a length of each of the upper and lower sides of the opposite surface 320 of the LGP 300. However, the present disclosure is not limited thereto, and the first color pattern 410*c* can have various shapes.

The first color pattern 410*c* may be provided in a plurality. In this case, the first color patterns 410*c* may be arranged at regular intervals. In addition, the first color patterns 410*c* may be arranged in a row. The first color patterns 410*c* may be arranged parallel to each other and may have equal widths. Further, the first color patterns 410*c* may be point-symmetrical to each other with respect to a central point on the surface of the first reflective layer 410*a*.

The color of the first color patterns 410*c* may be substantially complementary to the color of light emitted from the light source unit 200. In an example embodiment, if blue light is emitted from the light source unit 200, the color of the first color patterns 410*c* may be yellow.

The first color patterns 410*c* may include a fluorescent material. In an example embodiment, the first color patterns 410*c* may include, but are not limited to, a Garnet-based yellow fluorescent material. A particle shape of the Garnet-based yellow fluorescent material is close to a spherical shape. Therefore, if the Garnet-based yellow fluorescent material is used, it may be easy to employ a coating process to a process of forming the first color patterns 410*c*.

A particle diameter of the fluorescent material included in the first color patterns 410*c* may be approximately 30 μm or less. Usefully, the particle diameter of the fluorescent material included in the first color patterns 410*c* may be approximately 10 μm or less.

The first color patterns 410*c* may include 5 to 40 percent by weight, based on solvent, of a fluorescent material. Usefully, the first color patterns 410*c* may include 10 to 20 percent by weight, based on solvent, of a fluorescent material.

Light incident upon the first color patterns 410*c* may be reflected by surfaces of the first color patterns 410*c* toward the LGP 300. In addition, light incident upon the first color patterns 410*c* may pass through the first color patterns 410*c* to reach the surface of the first reflective layer 410*a*. Then, the light reaching the surface of the first reflective layer 410*a* may be reflected by the surface of the first reflective layer 410*a* back to the LGP 300.

The first color patterns 410*c* may have a thickness of 2 to 20 μm. Specifically, the first color patterns 410*c* may have a thickness of, but not limited to, 5 μm. The thickness of each of the first color patterns 410*c* is the distance each of the first color patterns 410*c* protrudes from the surface of the first reflective layer 410*a*.

The second reflective member 420 may be disposed on the first side surface 330 of the LGP 300. The second reflective member 420 may be placed to face the first side surface 330 of the LGP 300. In addition, the second reflective member 420 may be placed parallel to the first side surface 330 of the LGP 300. The shape of the second reflective member 420 may correspond to the shape of the first side surface 330 of the LGP 300. In an example embodiment, the second reflective member 420 and the first side surface 330 may completely overlap each other.

The second reflective member 420 may include a second reflective layer 420*a*, a second adhesive layer 420*b*, and a second color pattern 420*c*.

The second reflective layer 420*a* may include a reflective material. In addition, the second reflective layer 420*a* may be made of a rigid material. However, the material of the second reflective layer 420*a* is not limited to the rigid material, and the second reflective layer 420*a* may also be made of a flexible material. In addition, a surface of the second reflective layer 420*a* which faces the first side surface 330 of the LGP 300 may be white. The second reflective layer 420*a* may be made of the same material as the first reflective layer 410*a*.

The second adhesive layer 420*b* may be located on the second reflective layer 420*a*. Specifically, the second adhesive layer 420*b* may be located on the surface of the second reflective layer 420*a* which faces the first side surface 330 of the LGP 300. The second adhesive layer 420*b* may completely overlap the second reflective layer 420*a*.

The second adhesive layer 420*b* may be made of at least one of a thermosetting adhesive, a catalyst containing adhesive, a moisture cure adhesive, an anaerobic adhesive, a hot melt adhesive, an OCA, and a pressure-sensitive adhesive.

In addition, the second adhesive layer 420b may be made of the same material as the first adhesive layer 410b.

The second adhesive layer 420b may directly contact the first side surface 330 of the LGP 300. That is, the second adhesive layer 420b may be attached to the first side surface 330 of the LGP 300, thereby fixing the LGP 300 and the second reflective member 420 to each other.

The second color pattern 420c may be interposed between the second reflective layer 420a and the second adhesive layer 420b. Specifically, the second color pattern 420c may be completely surrounded by the second reflective layer 420a and the second adhesive layer 420b.

The second color pattern 420c may be formed on the surface of the second reflective layer 420a which faces the first side surface 330 of the LGP 300. That is, light emitted from the light source unit 200 may pass through the LGP 300 and the second adhesive layer 420b to enter the second color pattern 420c.

The second color pattern 420c may be shaped like a stripe. However, the shape of the second color pattern 420c is not limited to the stripe, and the second color pattern 420c can have various shapes. In addition, the second color pattern 420c may have substantially the same shape as the first color pattern 410c.

The second color pattern 420c may be provided in a plurality. In this case, the second color patterns 420c may be arranged at regular intervals. In addition, the second color patterns 420c may be arranged in a row. The second color patterns 420c may be arranged parallel to each other and may have equal widths. Further, the second color patterns 420c may be point-symmetrical to each other with respect to a central point on the surface of the second reflective layer 420a.

The color of the second color patterns 420c may be substantially complementary to the color of light emitted from the light source unit 200. In an example embodiment, if blue light is emitted from the light source unit 200, the color of the second color patterns 420c may be yellow.

The second color patterns 420c may include a fluorescent material. In an example embodiment, the second color patterns 420c may include, but not be limited to, a Garnet-based yellow fluorescent material. In another example embodiment, the second color patterns 420c may be made of the same material as the first color patterns 410c.

Light incident upon the second color patterns 420c may be reflected by surfaces of the second color patterns 420c toward the LGP 300. In addition, light incident upon the second color patterns 420c may pass through the second color patterns 420c to reach the surface of the second reflective layer 420a. Then, the light reaching the surface of the second reflective layer 420a may be reflected by the surface of the second reflective layer 420a back to the LGP 300.

The third reflective member 430 may be disposed on the second side surface 340 of the LGP 300. The third reflective member 430 may be placed to face the second side surface 340 of the LGP 300. In addition, the third reflective member 430 may be placed parallel to the second side surface 340 of the LGP 300. The shape of the third reflective member 430 may correspond to the shape of the second side surface 340 of the LGP 300. In an example embodiment, the third reflective member 430 and the second side surface 340 may completely overlap each other.

The third reflective member 430 may include a third reflective layer 430a, a third adhesive layer 430b, and a third color pattern 430c.

The third reflective layer 430a may include a reflective material. In addition, the third reflective layer 430a may be made of a rigid material. However, the material of the third reflective layer 430a is not limited to the rigid material, and the third reflective layer 430a may also be made of a flexible material. In addition, a surface of the third reflective layer 430a which faces the second side surface 340 of the LGP 300 may be white. The third reflective layer 430a may be made of the same material as the first reflective layer 410a.

The third adhesive layer 430b may be located on the third reflective layer 430a. Specifically, the third adhesive layer 430b may be located on the surface of the third reflective layer 430a which faces the second side surface 340 of the LGP 300. The third adhesive layer 430b may completely overlap the third reflective layer 430a.

The third adhesive layer 430b may be made of at least one of a thermosetting adhesive, a catalyst containing adhesive, a moisture cure adhesive, an anaerobic adhesive, a hot melt adhesive, an OCA, and a pressure-sensitive adhesive. In addition, the third adhesive layer 430b may be made of the same material as the first adhesive layer 410b.

The third adhesive layer 430b may directly contact the second side surface 340 of the LGP 300. That is, the third adhesive layer 430b may be attached to the second side surface 340 of the LGP 300, thereby fixing the LGP 300 and the third reflective member 430 to each other.

The third color pattern 430c may be interposed between the third reflective layer 430a and the third adhesive layer 430b. Specifically, the third color pattern 430c may be completely surrounded by the third reflective layer 430a and the third adhesive layer 430b.

The third color pattern 430c may be formed on the surface of the third reflective layer 430a which faces the second side surface 340 of the LGP 300. That is, light emitted from the light source unit 200 may pass through the LGP 300 and the third adhesive layer 430b to enter the third color pattern 430c.

The third color pattern 430c may be shaped like a stripe. However, the shape of the third color pattern 430c is not limited to the stripe, and the third color pattern 430c can have various shapes. In addition, the third color pattern 430c may have substantially the same shape as the first color pattern 410c.

The third color pattern 430c may be provided in a plurality. In this case, the third color patterns 430c may be arranged at regular intervals. In addition, the third color patterns 430c may be arranged in a row. The third color patterns 430c may be arranged parallel to each other and may have equal widths. Further, the third color patterns 430c may be point-symmetrical to each other with respect to a central point on the surface of the third reflective layer 430a.

The color of the third color patterns 430c may be substantially complementary to the color of light emitted from the light source unit 200. In an example embodiment, if blue light is emitted from the light source unit 200, the color of the third color patterns 430c may be yellow.

The third color patterns 430c may include a fluorescent material. In an example embodiment, the third color patterns 430c may include, but are not limited to, a Garnet-based yellow fluorescent material. In another example embodiment, the third color patterns 430c may be made of the same material as the first color patterns 410c.

Light incident upon the third color patterns 430c may be reflected by surfaces of the third color patterns 430c toward the LGP 300. In addition, light incident upon the third color patterns 430c may pass through the third color patterns 430c to reach the surface of the third reflective layer 430a. Then, the light reaching the surface of the third reflective layer 430a may be reflected by the surface of the third reflective layer 430a back to the LGP 300.

The second reflective member 420 and the third reflective member 430 may be placed symmetrical to each other with respect to the LGP 300. In addition, the second reflective member 420 and the third reflective member 430 may be placed parallel to each other. The second adhesive layer 420b of the second reflective member 420 and the third adhesive layer 430b of the third reflective member 430 may face each other.

In the example embodiment illustrated in the drawings, the first reflective member 410, the second reflective member 420, and the third reflective member 430 are separated from each other. However, the present disclosure is not limited thereto, and they may also be formed as a single piece.

Because the light source unit 200, the first reflective member 410, the second reflective member 420, and the third reflective member 430 cover the side surfaces of the LGP 300, they can prevent light input into the LGP 300 from leaking through the side surfaces of the LGP 300.

Figure 6:
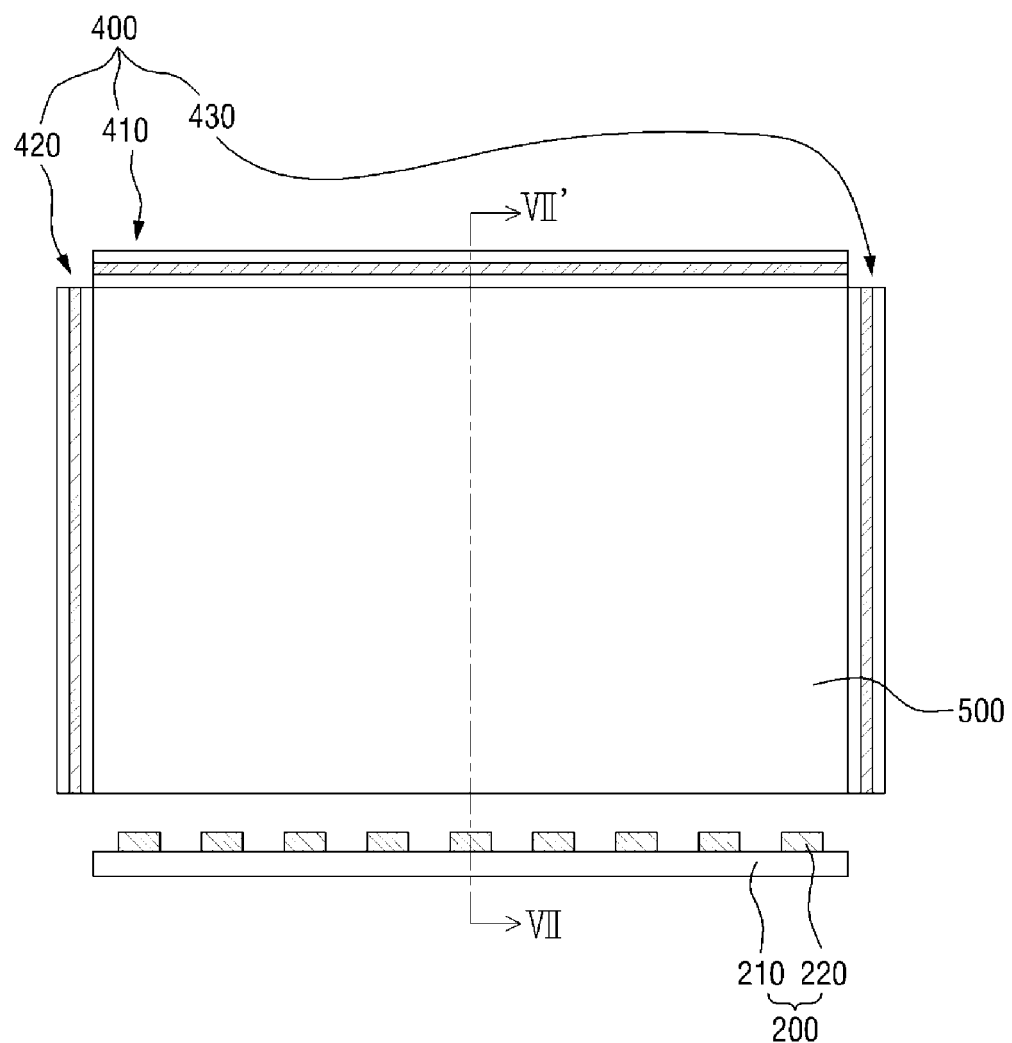
FIG. 6 is a plan view of the backlight assembly of FIG. 3.
Figure 7:
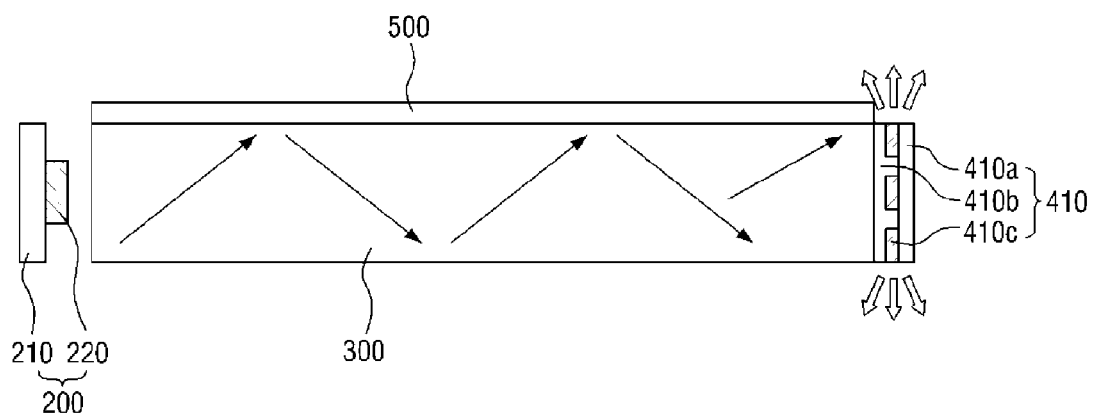
FIG. 7 is a cross-sectional view taken along the line VII-VII' of FIG. 6.

A mechanism for preventing blue light from leaking through the side surfaces of the LGP 300 will now be described with reference to FIGS. 6 and 7. FIG. 6 is a plan view of the backlight assembly of FIG. 3. FIG. 7 is a cross-sectional view taken along the line VII-VII' of FIG. 6. For ease of description, it is assumed that blue light is emitted from the light source unit 200 and that the first color patterns 410c are made of a yellow fluorescent material.

Referring to FIGS. 6 and 7, when blue light emitted from the light source unit 200 enters the LGP 300, a portion of the blue light entering the LGP 300 may reach the opposite surface 320 of the LGP 300. Here, a portion of the blue light reaching the opposite surface 320 of the LGP 300 may enter the first color patterns 410c, and the yellow fluorescent material of the first color patterns 410c may convert the portion of the blue light incident upon the first color patterns 410c into white light. Accordingly, white light, not blue light, may be output upward and downward from the opposite surface 320 of the LGP 300. That is, the backlight assembly according to the current embodiment can prevent the leakage of blue light through the side surfaces of the LGP 300.

If the wavelength conversion member 500 disposed on the upper surface of the LGP 300 includes quantum dots, high-purity white light can be provided to the display panel 100. That is, because the quantum dots can significantly increase the color purity of light passing therethrough compared with a phosphor, they can significantly increase the resolution of an image displayed on the display panel 100.

Hereinafter, first reflective members according to other embodiments will be described. Only the first reflective members will be described in detail below. However, because second and third reflective members are substantially the same as the first reflective members, a detailed description thereof will be omitted.

Figure 8:
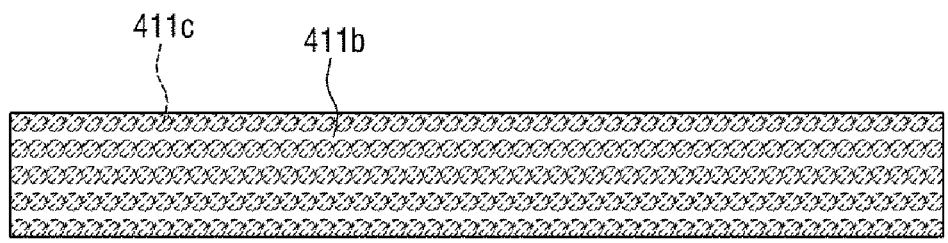
FIG. 8 is a front view of a first reflective member of a backlight assembly according to another embodiment.

FIG. 8 is a front view of a first reflective member 411 of a backlight assembly according to another embodiment. For simplicity, elements substantially identical to those illustrated in the above-described drawings are indicated by like reference numerals, and thus a redundant description thereof will be omitted.

Referring to FIG. 8, the first reflective member 411 may include a plurality of first color patterns 411c, and each of the first color patterns 411c may be shaped like a dot. The first color patterns 411c may be arranged in a matrix. In an example embodiment, a plurality of first color patterns 411c arranged in a row direction may contact each other, and a plurality of first color patterns 411c arranged in a column direction may be separated from each other. Because the first color patterns 411c according to the current embodiment have a different shape from those of the previous embodiment, a first adhesive layer 411b covering the first color patterns 411c according to the current embodiment may also have a different shape from that of the previous embodiment so as to correspond to the shape of the first color patterns 411c.

Figure 9:
FIG. 9 is a front view of a first reflective member of a backlight assembly according to another embodiment.

FIG. 9 is a front view of a first reflective member 412 of a backlight assembly according to another embodiment. For simplicity, elements substantially identical to those illustrated in the above-described drawings are indicated by like reference numerals, and thus a redundant description thereof will be omitted.

Referring to FIG. 9, a plurality of first color patterns 412c may be located only in a region adjacent to a side of an opposite surface 320 which contacts an exit surface 360 of an LGP 300 and a region adjacent to the other side of the opposite surface 320 which faces the above side. In other words, the first color patterns 412c may be located only in a region adjacent to an upper side of the opposite surface 320 and a region adjacent to a lower side of the opposite surface 320. That is, the first color patterns 412c may be located only in a region adjacent to the exit surface 360 of the LGP 300 and a region adjacent to a support surface 350 of the LGP 300. Because the first color patterns 412c according to the current embodiment have a different shape from those of the previous embodiments, a first adhesive layer 412b covering the first color patterns 412c according to the current embodiment may also have a different shape from those of the previous embodiments so as to correspond to the shape of the first color patterns 412c.

Figure 10:
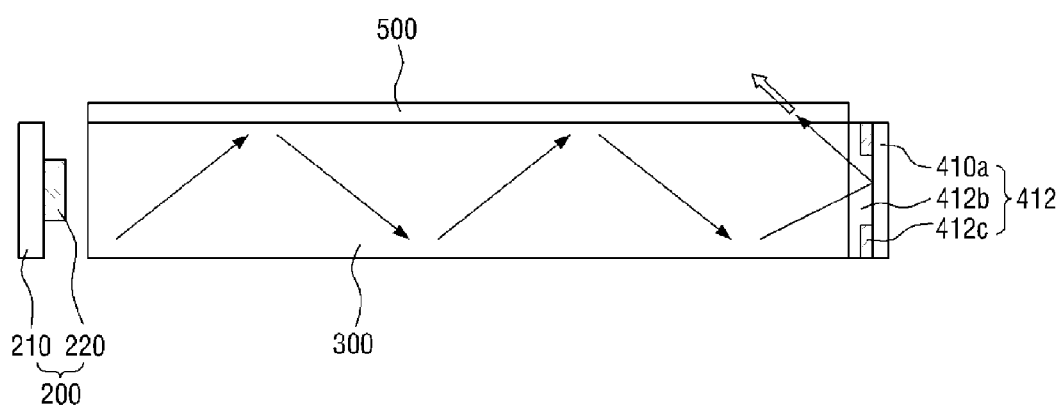
FIG. 10 is a cross-sectional view of a backlight assembly employing the first reflective member of FIG. 9.

The first reflective member 412 structured as described above not only prevents the leakage of blue light through side surfaces of the LGP 300, but also prevents the blue light from being excessively wavelength-converted into yellow light. This will now be described in detail with reference to FIG. 10. FIG. 10 is a cross-sectional view of a backlight assembly employing the first reflective member 412 of FIG. 9. For ease of description, it is assumed that a light source unit 200 emits blue light and that the first color patterns 412c are made of a yellow fluorescent material.

Referring to FIG. 10, when blue light emitted from the light source unit 200 reaches an opposite surface 320 of an LGP 300, a portion of the blue light may enter the first color patterns 412c located in a region adjacent to an exit surface 360 of the LGP 300 and a region adjacent to a support surface 350 of the LGP 300. This portion of the blue light incident upon the first color patterns 412c may be wavelength-converted and then output accordingly. If the first color patterns 412c are placed only in regions where blue light leaks as described above, the leakage of the blue light can be prevented at a minimum cost.

The other portion of the blue light reaching the opposite surface 320 of the LGP 300 after being emitted from the light source unit 200 may be reflected at a center of a surface of a first reflective layer 410a, where the first color patterns 412c are not formed, to enter a wavelength conversion member 500. This portion of the blue light incident upon the wavelength conversion member 500 may be converted into white light and then output accordingly. If the first color patterns 412c are located on the center of the surface of the first reflective layer 410a, blue light reaching the opposite surface 320 may be wavelength-converted by the first color patterns 412c and then wavelength-converted again by the wavelength conversion member 500. If blue light is excessively wavelength-converted like this, yellow light, not white light, may be output. To prevent this phenomenon, the first color patterns 412c may not be formed on the center of the surface of the first reflective layer 410a.

Figure 11:
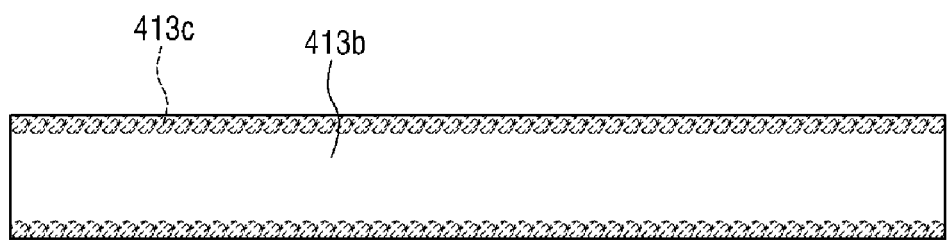
FIGS. 11 through 16 are front views of first reflective members according to other embodiments.
Figure 12:
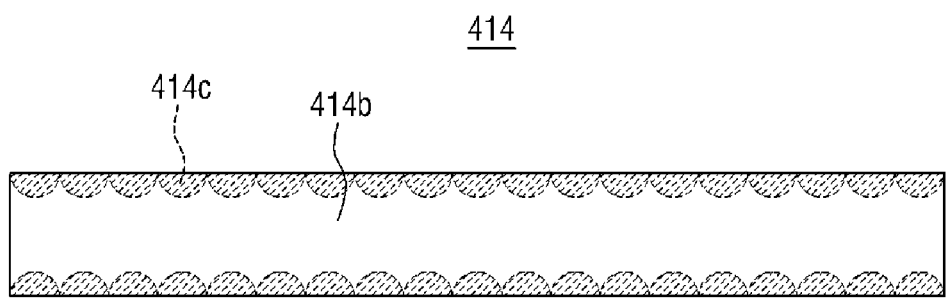
Figure 13:
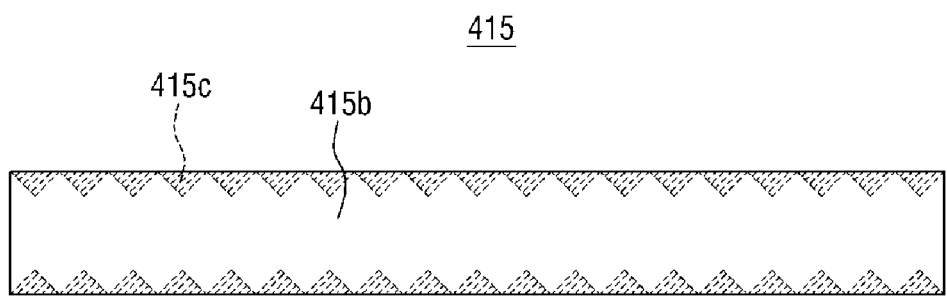

FIGS. 11 through 13 are front views of first reflective members 413 through 415 according to other embodiments. For simplicity, elements substantially identical to those illustrated in the above-described drawings are indicated by like reference numerals, and thus a redundant description thereof will be omitted.

Referring to FIGS. 11 through 13, a plurality of first color patterns 413c, 414c, and 415c may be dot-shaped, semicircular, and triangular, respectively. The first color patterns 413c, 414c, and 415c may be arranged in a row to be adjacent to an upper side and a lower side of a surface of a first reflective layer 410a. Because the first color patterns 413c through 415c according to the current embodiments have different shapes from those of the previous embodiments, first adhesive layers 413b, 414b, and 415b covering the first color patterns 413c, 414c, and 415c according to the current embodiments may also have different shapes from those of the previous embodiments so as to correspond to the shapes of the first color patterns 413c through 415c, respectively.

Figure 14:
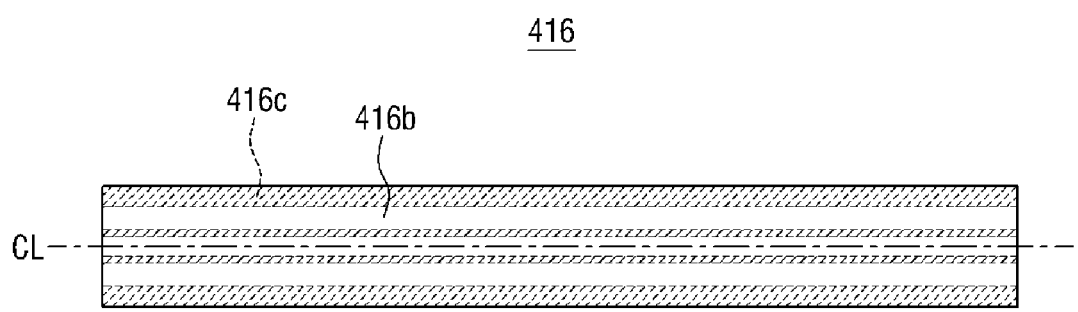
Figure 15:
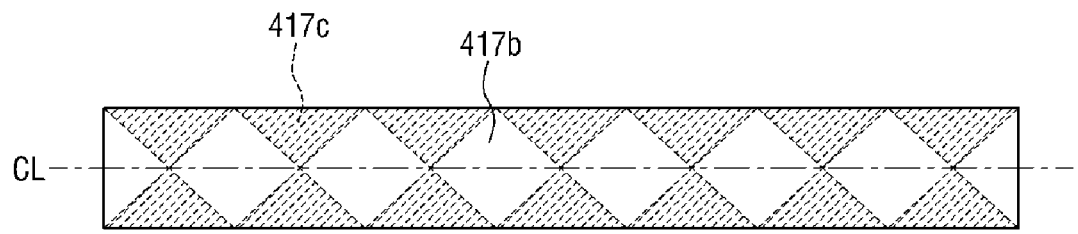

FIGS. 14 and 15 are front views of first reflective members 416 and 417 according to other embodiments. For simplicity, elements substantially identical to those illustrated in the above-described drawings are indicated by like reference numerals, and thus a redundant description thereof will be omitted.

Referring to FIGS. 14 and 15, a plurality of first color patterns 416c and 417c may be reduced in area toward a virtual line (i.e., a centerline CL) that is parallel to a side of an opposite surface 320, which contacts an exit surface 360, and halves the opposite surface 320. Because the first color patterns 416c and 417c according to the current embodiments have different shapes from those of the previous embodiments, first adhesive layers 416b and 417b covering the first color patterns 416c and 417c according to the current embodiments may also have different shapes from those of the previous embodiments so as to correspond to the shapes of the first color patterns 416c and 417c, respectively.

Referring to FIG. 14, the first color patterns 416c adjacent to each other may be separated by an equal distance, but may be reduced in width toward the centerline CL. Referring to FIG. 15, each of the first color patterns 417c may be shaped like a triangle, and a side of the triangle may contact an upper or lower side of a first reflective layer 410a.

Figure 16:
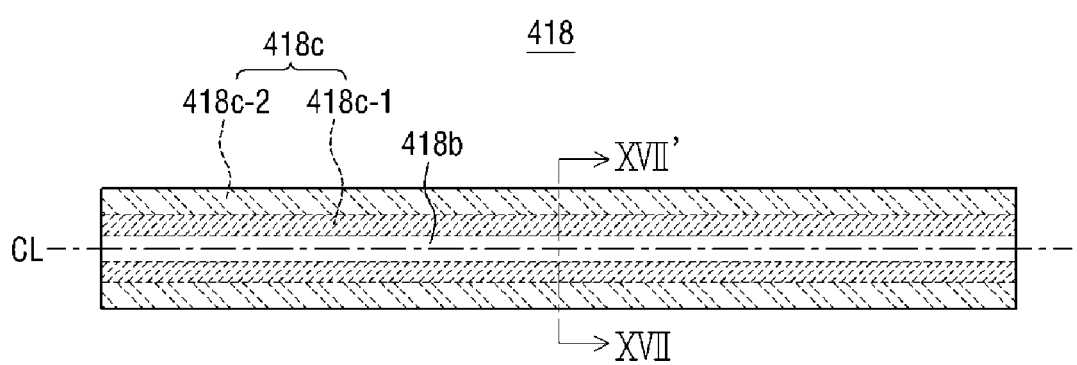
Figure 17:
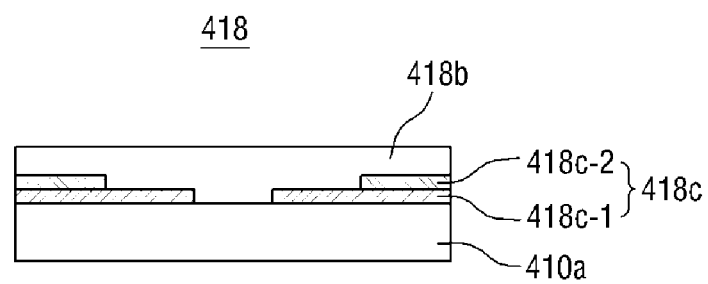
FIG. 17 is a cross-sectional view taken along the line XVII-XVII' of FIG. 16.

FIG. 16 is a front view of a first reflective member 418 according to another embodiment. FIG. 17 is a cross-sectional view taken along the line XVII-XVII' of FIG. 16. For simplicity, elements substantially identical to those illustrated in the above-described drawings are indicated by like reference numerals, and thus a redundant description thereof will be omitted.

Referring to FIGS. 16 and 17, a plurality of first color patterns 418c may be reduced in thickness toward a centerline CL. Specifically, the first color patterns 418c may include a plurality of first sub color patterns 418c-1 and a plurality of second sub color patterns 418c-2. The first sub color patterns 418c-1 may be located on a surface of a first reflective layer 410a, and the second sub color patterns 418c-2 may be located on the first sub color patterns 418c-1. The first sub color patterns 418c-1 and the second sub color patterns 418c-2 are all located only in a region adjacent to an exit surface 360 of an LGP 300 and a region adjacent to a support surface 350 of the LGP 300. However, the first sub color patterns 418c-1 may be greater in area than the second sub color patterns 418c-2. In addition, the second sub color patterns 418c-2 may be located only on edges of the first sub color patterns 418c-1. The first color patterns 418c may be formed by performing a coating process twice on the first reflective layer 410a. However, the present disclosure is not limited thereto, and the first color patterns 418c may be gradually reduced in thickness toward the centerline CL. Because the first color patterns 418c according to the current embodiment have a different shape from those of the previous embodiments, a first adhesive layer 418b covering the first color patterns 418c according to the current embodiment may also have a different shape from those of the previous embodiments so as to correspond to the shape of the first color patterns 418c.

Figure 18:
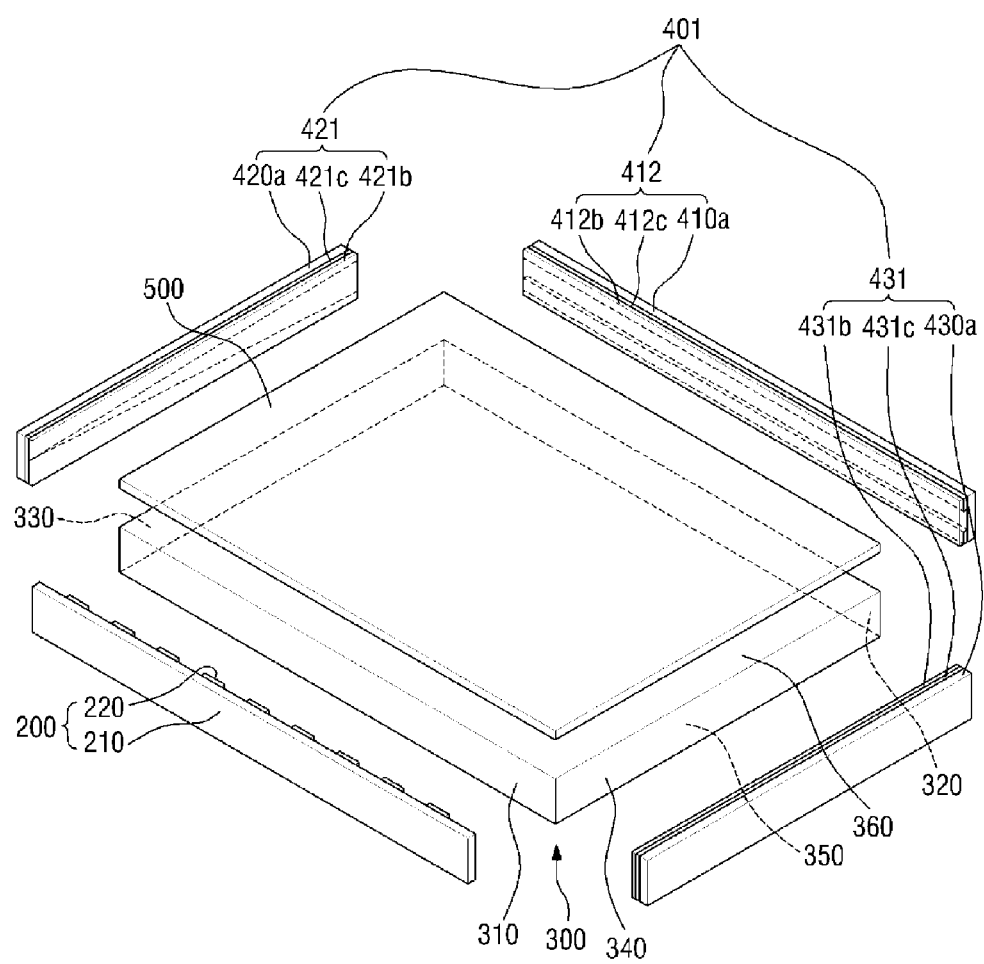
FIG. 18 is an exploded perspective view of a backlight assembly according to another embodiment.
Figure 19:
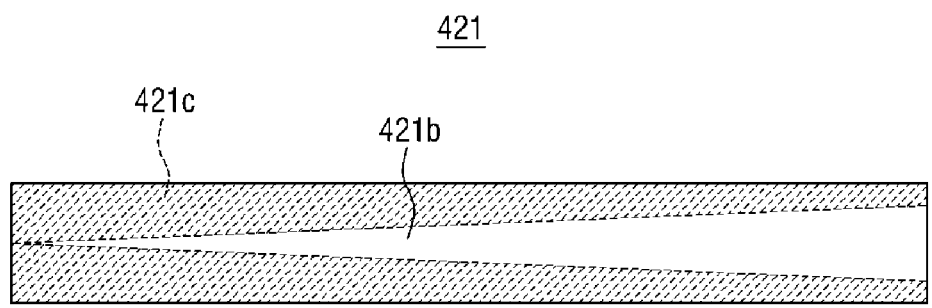
FIG. 19 is a front view of a second reflective member of the backlight assembly of FIG. 18.

FIG. 18 is an exploded perspective view of a backlight assembly according to another embodiment. FIG. 19 is a front view of a second reflective member 421 of the backlight assembly of FIG. 18. For simplicity, elements substantially identical to those illustrated in the above-described drawings are indicated by like reference numerals, and thus a redundant description thereof will be omitted.

Referring to FIGS. 18 and 19, a first reflective member 412 among a plurality of reflective members 401 is identical to the first reflective member 412 illustrated in FIG. 9, and thus a detailed description thereof will be omitted.

A plurality of second color patterns 421c of the second reflective member 421 may be reduced in area or thickness as a distance from a light source unit 200 increases. In the example embodiment of FIGS. 18 and 19, the second color patterns 421c may be reduced in area as the distance from the light source unit 200 increases. Because the second color patterns 421c according to the current embodiment have a different shape from those of the previous embodiments, a second adhesive layer 421b covering the second color patterns 421c according to the current embodiment may also have a different shape from those of the previous embodiments so as to correspond to the shape of the second color patterns 421c.

A plurality of third color patterns 431c of a third reflective member 431 may also be reduced in area or thickness as the distance from the light source unit 200 increases. Because the third color patterns 431c according to the current embodiment have a different shape from those of the previous embodiments, a third adhesive layer 431b covering the third color patterns 431c according to the current embodiment may also have a different shape from those of the previous embodiments so as to correspond to the shape of the third color patterns 431c.

Blue light with high intensity is incident upon a region of the second reflective member 421 and a region of the third reflective member 431 which are adjacent to the light source unit 200, and blue light with low intensity is incident upon a region of the second reflective member 421 and a region of the third reflective member 431 which are far away from the light source unit 200. Therefore, if the shapes of the second color patterns 421c and the third color patterns 431c are adjusted based on this fact, white light can be emitted through side surfaces of the LGP 300.

Figure 20:
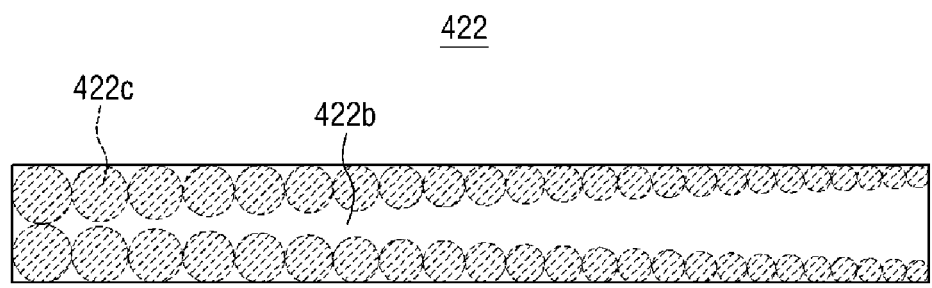
FIG. 20 is a front view of a second reflective member of a backlight assembly according to another embodiment.

FIG. 20 is a front view of a second reflective member 422 of a backlight assembly according to another embodiment. For simplicity, elements substantially identical to those illustrated in the above-described drawings are indicated by like reference numerals, and thus a redundant description thereof will be omitted. In addition, because a third reflective member has substantially the same shape as the second reflective member 422, drawings and a description thereof will be omitted.

Referring to FIG. 20, a plurality of second color patterns 422c of the second reflective member 422 may be shaped like a plurality of dots, and the dots may be reduced in size as a distance from a light source unit 200 increases. Because the second color patterns 422c according to the current embodiment have a different shape from those of the previous embodiments, a second adhesive layer 422b covering the second color patterns 422c according to the current embodiment may also have a different shape from those of the previous embodiments so as to correspond to the shape of the second color patterns 422c.

Embodiments of the present disclosure provide at least one of the following advantages.

It is possible to prevent the leakage of light through side surfaces of an LGP in a structure in which a wavelength conversion member is disposed on an upper surface of the LGP.

However, the effects of the present disclosure are not restricted to the one set forth herein. The above and other effects of the present disclosure will become more apparent to one of daily skill in the art to which the present disclosure pertains by referencing the claims.

While the present disclosure has been particularly shown and described with reference to example embodiments thereof, it will be understood by those of ordinary skill in the art that various changes in form and details may be made therein without departing from the spirit and scope of the present disclosure, including as the following claims. It is therefore desired that the present embodiments be considered in all respects as illustrative and not restrictive.

What is claimed is:

1. A backlight assembly comprising:
    a light source unit which emits light;
    a light guide plate (LGP) comprising an incident surface upon which light emitted from the light source unit is incident, an opposite surface which faces the incident surface, and an exit surface which connects the incident surface and the opposite surface and from which light incident upon the incident surface exits;
    a wavelength conversion member which is located on the exit surface and converts a wavelength of light output from the exit surface; and
    a first reflective member which is located on the opposite surface and reflects light incident upon the opposite surface,
    wherein the first reflective member comprises a plurality of first color patterns which face the opposite surface.

2. The backlight assembly of claim 1, wherein the wavelength conversion member comprises quantum dots.

3. The backlight assembly of claim 1, wherein the wavelength conversion member converts a color of light output from the exit surface into a white color.

4. The backlight assembly of claim 1, wherein the first color patterns are located only in a region adjacent to a side of the opposite surface which contacts the exit surface and a region adjacent to the other side of the opposite surface.

5. The backlight assembly of claim 1, wherein the first color patterns are reduced in area or thickness toward a virtual line that is parallel to the side of the opposite surface which contacts the exit surface and that halves the opposite surface.

6. The backlight assembly of claim 1, wherein the first reflective member further comprises a first reflective layer and a first adhesive layer located on the first reflective layer, wherein the first color patterns are interposed between the first reflective layer and the first adhesive layer.

7. The backlight assembly of claim 1, wherein the first color patterns comprise a yellow phosphor.

8. The backlight assembly of claim 1, wherein the light source unit emits blue light.

9. The backlight assembly of claim 1, wherein the LGP further comprises a first side surface and a second side surface which face each other and connect lateral sides of the incident surface and lateral sides of the opposite surface and further comprising a second reflective member which is located on the first side surface and reflects light incident upon the first side surface and a third reflective member which is located on the second side surface and reflects light incident upon the second side surface, wherein the second reflective member comprises a plurality of second color patterns which face the first side surface, and the third reflective member comprises a plurality of third color patterns which face the second side surface.

10. The backlight assembly of claim 9, wherein the second reflective member further comprises a second reflective layer and a second adhesive layer located on the second reflective layer, and the third reflective member further comprises a third reflective layer and a third adhesive layer located on the third reflective layer, wherein the second color patterns are interposed between the second reflective layer and the second adhesive layer, and the third color patterns are interposed between the third reflective layer and the third adhesive layer.

11. The backlight assembly of claim 9, wherein the second and third color patterns are made of substantially the same material as the first color patterns.

12. The backlight assembly of claim 9, wherein the second and third color patterns are reduced in area or thickness as a distance from the light source increases.

13. A backlight assembly comprising:
    a light guide plate (LGP) comprising an upper surface, a lower surface which faces the upper surface, and a plurality of side surfaces which connect the upper surface and the lower surface, the side surfaces including an incident surface and an opposite surface that are in parallel planes;
    a light source unit which is located on the incident surface of the LGP and provides light to the LGP; and
    a reflective member located on the opposite surface of the LGP and reflects light provided to the LGP,
    wherein each of the reflective members comprises a plurality of color patterns which face the LGP.

14. The backlight assembly of claim 13, further comprising a wavelength conversion member which is located on the upper surface of the LGP and converts a wavelength of light output from the LGP.

15. The backlight assembly of claim 14, wherein the wavelength conversion member comprises quantum dots.

16. The backlight assembly of claim 13, wherein the color patterns are located only in a region adjacent to the upper surface of the LGP and a region adjacent to the lower surface of the LGP.

17. The backlight assembly of claim 13, wherein each of the reflective members further comprises a reflective layer and an adhesive layer located on the reflective layer, wherein the color patterns are interposed between the reflective layer and the adhesive layer.

18. A display device comprising:
    a display panel which displays an image; and
    a backlight assembly which provides light to the display panel, wherein the backlight assembly comprises:
- a light source unit which emits light;
- a light guide plate (LGP) comprising an incident surface upon which light emitted from the light source unit is incident, an opposite surface which faces the incident surface, and an exit surface which connects the incident surface and the opposite surface and from which light incident upon the incident surface exits;
- a wavelength conversion member which is located on the exit surface and converts a wavelength of light output from the exit surface; and
- a first reflective member which is located on the opposite surface and reflects light incident upon the opposite surface,
- wherein the first reflective member comprises a plurality of first color patterns which face the opposite surface.

19. The display device of claim 18, wherein the wavelength conversion member comprises quantum dots.

20. The display device of claim 18, wherein the LGP further comprises a first side surface and a second side surface which face each other and connect lateral sides of the incident surface and lateral sides of the opposite surface and further comprising a second reflective member which is located on the first side surface and reflects light incident upon the first side surface and a third reflective member which is located on the second side surface and reflects light incident upon the second side surface, wherein the second reflective member comprises a plurality of second color patterns which face the first side surface, and the third reflective member comprises a plurality of third color patterns which face the second side surface.

* * * * *